(12) United States Patent
Rosén et al.

(10) Patent No.: US 11,988,395 B2
(45) Date of Patent: May 21, 2024

(54) THERMAL ENERGY EXTRACTION ASSEMBLY

(71) Applicant: E.ON SVERIGE AB, Malmo (SE)

(72) Inventors: Per Rosén, Lund (SE); Jacob Skogström, Lomma (SE); Helen Carlström, Bjärred (SE); Bengt Lindoff, Bjärred (SE)

(73) Assignee: E.ON SVERIGE AB, Malmo (SE)

( * ) Notice: Subject to any disclaimer, the term of this patent is extended or adjusted under 35 U.S.C. 154(b) by 108 days.

(21) Appl. No.: 17/304,895

(22) Filed: Jun. 28, 2021

(65) Prior Publication Data

US 2022/0003427 A1  Jan. 6, 2022

(30) Foreign Application Priority Data

Jul. 2, 2020  (EP) .................................... 20183734

(51) Int. Cl.
*F24D 10/00* (2022.01)
*F24D 3/18* (2006.01)
*F24D 11/02* (2006.01)

(52) U.S. Cl.
CPC ............. *F24D 10/003* (2013.01); *F24D 3/18* (2013.01); *F24D 11/0207* (2013.01); *F24D 2200/12* (2013.01); *F24D 2200/123* (2013.01); *F24D 2200/13* (2013.01)

(58) Field of Classification Search
CPC ...... F24D 10/00; F24D 10/003; F24D 10/006; F24D 2200/13; F24F 3/08; F25D 17/02
See application file for complete search history.

(56) References Cited

U.S. PATENT DOCUMENTS

| 4,124,177 | A |   | 11/1978 | Timmerman |
| 4,495,777 | A | * | 1/1985 | Babington .............. F25D 17/02 165/300 |
| 6,640,561 | B2 | * | 11/2003 | Roberto ................ F25B 25/005 62/96 |
| 9,625,222 | B2 | * | 4/2017 | Fischer ................. F24F 5/0089 |
| 10,408,472 | B1 | * | 9/2019 | Miglio ...................... F24F 3/08 |
| 10,488,061 | B2 | * | 11/2019 | Costakis .................. F24F 11/83 |
| 2012/0279681 | A1 | * | 11/2012 | Vaughan ................ F25B 30/06 165/96 |

(Continued)

FOREIGN PATENT DOCUMENTS

| EP | 2182296 | 5/2010 |
| EP | 2631546 | 8/2013 |

(Continued)

*Primary Examiner* — Christopher R Zerphey
(74) *Attorney, Agent, or Firm* — Knobbe, Martens, Olson & Bear, LLP

(57) ABSTRACT

A thermal energy extraction assembly is disclosed, the thermal energy extraction assembly is configured to extract heat and/or cold from a thermal energy distribution grid. The assembly may include a connection circuit connecting the assembly to the grid; a first heat exchanger configured to exchange heat from a heating circuit to the grid; a second heat exchanger configured to extract heat from the grid to a cooling circuit; and a plurality of heat pumps each having a condenser side connected to the heating circuit and an evaporator side connected to the cooling circuit, the heat pumps being configured to pump heat from the cooling circuit to the heating circuit.

12 Claims, 3 Drawing Sheets

(56) References Cited

U.S. PATENT DOCUMENTS

2013/0008193 A1*   1/2013   Platt .................... F25B 29/003
                                                                62/238.1

FOREIGN PATENT DOCUMENTS

| EP | 3273168 | | 1/2018 | | |
|----|---------|---|--------|---|---|
| EP | 3273169 | | 1/2018 | | |
| WO | WO 2010/102626 | | 9/2010 | | |
| WO | WO2018/015125 | * | 1/2018 | ............. | F24D 10/00 |

* cited by examiner

THERMAL ENERGY EXTRACTION ASSEMBLY

FIELD OF THE INVENTION

A thermal energy extraction assembly is presented. The thermal energy extraction assembly being configured to extract thermal energy (heat and/or cold) from a thermal energy distribution grid.

BACKGROUND OF THE INVENTION

Nearly all large developed cities in the world have at least two types of energy distribution grids incorporated in their infrastructures: one grid for providing heating and one grid for providing cooling. The grid for providing heating may e.g. be used for providing comfort and/or process heating, and/or hot tap water preparation. The grid for providing cooling may e.g. be used for providing comfort cooling and/or process cooling.

A common grid for providing heating is a gas grid or an electrical grid providing comfort and/or process heating, and/or hot tap water preparation. An alternative grid for providing heating is a district heating grid. The district heating grid is used for providing heated heat transfer fluid, typically in the form of water, to buildings of the city. A centrally placed heating and pumping plant is used for heating and distributing the heated heat transfer fluid. The heated heat transfer fluid is delivered to the buildings via one or more feed conduits and is returned to the heating and pumping plant via one or more return conduits. Locally at a building, heat from the heated heat transfer fluid is extracted via a district heating substation comprising a heat exchanger.

A common grid for providing cooling is the electrical grid. The electricity may e.g. be used for running refrigerators or freezers or for running air conditioners for providing comfort cooling. An alternative grid for providing cooling is a district cooling grid. The district cooling grid is used for providing cooled heat transfer fluid, typically in the form of water, to buildings of the city. A centrally placed cooling and pumping plant is used for cooling and distributing the thus cooled heat transfer fluid. The cooled heat transfer fluid is delivered to the buildings via one or more feed conduits and is returned to the cooling and pumping plant via one or more return conduits. Locally at a building, cold from the cooled heat transfer fluid is extracted via a heat pump.

The use of energy for heating and/or cooling is steadily increasing, influencing the environment negatively. By improving utilization of the energy distributed in the energy distribution grids, negative influences on the environment may be reduced. Hence, there is a need for improving utilization of the energy distributed in energy distribution grids, including existing grids. Provision of heating/cooling also requires huge investments when it comes to engineering projects and there is a constant strive to cut the costs. Hence, there is a need for improvements in how to provide sustainable solutions to heating and cooling.

SUMMARY OF THE INVENTION

It is an object of the present invention to solve at least some of the problems mentioned above.

According to a first aspect a thermal energy extraction assembly is provided. The thermal energy extraction assembly is configured to extract heat and/or cold from a thermal energy distribution grid. The thermal energy extraction assembly comprising a first heat exchanger, a heating circuit, a second heat exchanger, a cooling circuit, and a plurality of heat pumps. The first heat exchanger is configured to exchange heat from the heating circuit to the thermal energy distribution grid. The second heat exchanger is configured to extract heat from the thermal energy distribution grid to the cooling circuit. Each of the plurality of heat pumps having a condenser side connected to the heating circuit and an evaporator side connected to the cooling circuit. Each heat pumps being individually configured pump heat from cooling circuit heat transfer fluid of the cooling circuit to heating circuit heat transfer fluid of the heating circuit. The present thermal energy extraction assembly is based on using a combination of passive and active parts in the assembly. With passive is meant heat exchange between different hydraulic circuits. With active is meant an added ability to alter fluid temperatures beyond what just a heat exchanger can achieve. Typically, the fluid temperature is altered by pumping heat between different hydraulic circuits.

In case of using passive elements there is always a "temperature depletion" over the heat exchanger. When distributing heat, the temperature after the heat exchanger will always be lower than before. That is, the maximum temperature requirements at the point of taking out heat must always be lower than the temperature of the heat transfer fluid in the distribution grid. When distributing cold, the temperature after the heat exchanger will always be higher. That is, the minimum temperature requirement at the point of taking out cold must be higher than the temperature of the heat transfer fluid in the distribution grid. The passive solution requires that the cooling of the heat transfer fluid of the distribution grid, in case of heat outtake, and the heating of the heat transfer fluid of the distribution network, in case of cold outtake, can be done to a reasonable extent. Otherwise the possibility of hydraulically distributing the heat or cold will not be present.

When using a combination of passive and active elements as in the present invention heat pumping is decentralized to the different point of heat or cold outtake. Doing so, it is possible to satisfy local thermal needs without having to distribute sufficiently warm heat transfer fluid for the need, in case of a heating need, or to distribute sufficiently cold heat transfer fluid for the need, in case of a cooling need, which is the case if only passive elements are to be used. This creates totally different degrees of freedom than the rather strict thermal frames that apply on today's district heating and cooling systems where only passive elements are used.

Further, by, as in the present thermal energy extraction assembly, using passive components for primarily take out heat or cold from the thermal energy distribution grid and using an active component on a secondary side of the passive components, less constraints on the active component of the assembly may be set. For example, passive components (e.g. the first and second heat exchangers) may be designed to withstand higher fluid pressures than an active component (the heat pump). Further, an active component is typically designed to be feed with heat transfer fluid in a fixed temperature range, such a fixed temperature range is typically rather narrow. Passive components are typically not depending on the temperature of heat transfer fluid feed thereto. Hence, a wider range of temperatures may be used in the thermal energy distribution grid using passive components for outtake of heat and/or cold therefrom.

Moreover, the present thermal energy extraction assembly may be used for both outtake of heat and/or cold from the thermal energy distribution grid. The outtake of heat may be made either passive using a heat exchanger or active using a heat exchanger in combination with the heat pumps. The outtake of cold may be made either passive using a heat exchanger or active using a heat exchanger in combination with the heat pumps.

By using a plurality of heat pumps the thermal energy extraction assembly may be made modular. Further, low capacity heat pumps may be used working together as one heat pump with high capacity. Moreover, redundancy of the thermal energy extraction assembly may be achieved. In case a heat pump among the plurality of the heat pumps stops working the other once still may operate. Furthermore, the heat pumping capacity may easily be adopted to specific installations. All, or a majority, of the heat pumps may be operated, serviced or repaired according to a common scheme. Accordingly, an operator or service technician only need to learn one type of heat pump.

Further, by the present design using a plurality of heat pumps addition of additional heat pump capacity will be facilitated. In case of needing to add additional heat pump capacity additional heat pumps may be added to the thermal energy extraction assembly. A common problem when designing heat pump based thermal energy extraction assemblies is overdimensioning of the installed heat pump. By the present design of the thermal energy extraction assembly a narrowing down the capacity of the heat pump(s) may be made. This may make the installation cost to be more competitive. If more heat pump capacity is needed, it will be easy to add an additional heat pump to the assembly.

The first heat exchanger comprises a primary side and a secondary side. The primary side of the first heat exchanger may comprise a primary side inlet connectable to a cold conduit of the thermal energy distribution grid. The primary side may further comprise a primary side outlet connectable to a hot conduit of the thermal energy distribution grid. The secondary side of the first heat exchanger being connected to the heating circuit. The heating circuit may comprise a feed conduit configured to conduct heating circuit heat transfer fluid from an outlet of the secondary side of the first heat exchanger and a return conduit configured to conduct heating circuit heat transfer fluid to an inlet of the secondary side of the first heat exchanger. The first heat exchanger being configured to exchange heat from the secondary side to the primary side.

The second heat exchanger comprises a primary side and a secondary side. The primary side of the second heat exchanger may comprise a primary side inlet connectable to the hot conduit of the thermal energy distribution grid and a primary side outlet connectable to the cold conduit of the thermal energy distribution grid. The secondary side of the second heat exchanger being connected to the cooling circuit. The cooling circuit may comprise a feed conduit configured to conduct cooling circuit heat transfer fluid from an outlet of the secondary side of the second heat exchanger and a return conduit configured to conduct cooling circuit heat transfer fluid to an inlet of the secondary side of the second heat exchanger. The second heat exchanger being configured to exchange heat from the primary side to the secondary side.

The plurality of heat pumps may be connected between the heating circuit and the cooling circuit in parallel.

The condenser side of each heat pump may be connected to the feed conduit of the heating circuit. This facilitates to extract, by the heat pump, cold deposited by the first heat exchanger in the heating circuit before the deposited cold reaches the heat emitter. That is, it may be possible to efficiently run the assembly in a dual mode wherein both the heat emitter and the cooler may work at the same time.

The evaporator side of each heat pump may be connected to the feed conduit of the cooling circuit. This facilitates to extract, by the heat pump, heat deposited by the second heat exchanger in the cooling circuit before the deposited heat reaches the cooler. That is, it may be possible to efficiently run the assembly in a dual mode wherein both the heat emitter and the cooler may work at the same time.

Each of the plurality of heat pumps may be binary controllable to be either in an on mode or in an off mode. On/Off control of the heat pumps provides good compliance with heating and/or cooling needs as it is handled by a plurality of relatively small compressors instead of one or two relatively large heat pumps. On/Off control is much easier to control and handle as compared with frequency-controlled compressors of relatively large heat pumps. Relatively large heat pumps need to be able to be frequency controlled in order adjust the outtake of heat and or cold.

The thermal energy extraction assembly may further comprise a heat pump control unit configured to individually control each of the plurality of heat pumps.

The thermal energy extraction assembly may further comprise a connection circuit having a hot conduit connection connectable to the hot conduit of the thermal energy distribution grid and a cold conduit connection connectable to the cold conduit of the thermal energy distribution grid, the connection circuit being configured to conduct heat transfer fluid of the thermal energy distribution grid from the hot conduit connection to the cold conduit connection or vice versa.

The connection circuit may further comprise a valve arrangement configured to selectively direct a flow of heat transfer fluid in the connection circuit from the cold conduit connection via the primary side of the first heat exchanger to the hot conduit connection or from the hot conduit connection via the primary side of the second heat exchanger to the cold conduit connection.

The control unit may be configured to set the thermal energy extraction assembly in a heating mode or in a cooling mode. Upon setting the thermal energy extraction assembly in the heating mode the control unit may be configured to set the valve arrangement to direct a flow of heat transfer fluid in the connection circuit from the hot conduit connection via the primary side of the second heat exchanger to the cold conduit connection. Upon setting the thermal energy extraction assembly in the heating mode the control unit may be configured to activate one or more of the plurality of heat pumps to pump heat from cooling circuit heat transfer fluid of the cooling circuit to heating circuit heat transfer fluid of the heating circuit. Upon setting the thermal energy extraction assembly in the cooling mode the control unit may be configured to set the valve arrangement to direct a flow of heat transfer fluid in the connection circuit from the cold conduit connection via the primary side of the first heat exchanger to the hot conduit connection. Upon setting the thermal energy extraction assembly in the cooling mode the control unit may be configured to activate one or more of the plurality of heat pumps to pump cold from heating circuit heat transfer fluid of the heating circuit to cooling circuit heat transfer fluid of the cooling circuit.

The valve arrangement may comprise a flow controller configured to control the flow of heat transfer fluid in the connection circuit from the hot conduit connection to the cold conduit connection or vice versa. The flow controller may be configured to be selectively set in a pumping mode or in a flowing mode based on a local differential pressure between the hot conduit and the cold conduit and on a desired flow direction of heat transfer fluid in the connection circuit. The flow controller makes it possible to connect the thermal energy extraction assembly to a bi-directional thermal energy distribution grid.

The feed conduit of the heating circuit may be configured to feed a comfort heating heat emitter with heating circuit heat transfer fluid. The return conduit of the heating circuit may be configured to return heating circuit heat transfer fluid from the comfort heating heat emitter to the first heat exchanger. The feed conduit of the cooling circuit may be configured to feed a comfort cooling cooler with cooling circuit heat transfer fluid. The return conduit of the cooling circuit may be configured to return cooling circuit heat transfer fluid from the comfort cooling cooler to the second heat exchanger.

The thermal energy extraction assembly may further comprising a tap hot water heater, a tap hot water feeding conduit configured to conduct heating circuit heat transfer fluid from condenser side outlets of a subset of the heat pumps to the tap hot water heater, and a tap hot water return conduit configured to conduct heating circuit heat transfer fluid from the tap hot water heater to condenser side inlets of the subset of the heat pumps. The subset of the heat pumps may be less than 50% of the heat pumps.

The heating circuit may further comprise a heating circuit by-pass conduit configured to, via a heating circuit by-pass control valve, selectively direct a by-pass feed of heating circuit heat transfer fluid from the feed conduit of the heating circuit to the return conduit of the heating circuit, thereby selectively by-passing the heat emitter. The heating circuit by-pass control valve may be configured to partly or fully by-pass the heat emitter. The heating circuit by-pass control valve may be configured to not by-pass the heat emitter.

The cooling circuit may further comprise a cooling circuit by-pass conduit configured to, via a cooling circuit by-pass control valve, selectively direct a by-pass feed of cooling circuit heat transfer fluid from the feed conduit of the cooling circuit to the return conduit of the cooling circuit thereby selectively by-passing the cooler. The cooling circuit by-pass control valve may be configured to partly or fully by-pass the cooler. The cooling circuit by-pass control valve may be configured to not by-pass the cooler.

The valve arrangement may be configured to be set in different modes.

Upon set in a first mode, the valve arrangement is configured to direct heat transfer fluid of the thermal energy distribution grid from the cold conduit connection via the first heat exchanger to the hot conduit connection. This mode may be used for active outtake of cold from the thermal energy distribution grid.

Upon set in a second mode, the valve arrangement is configured to direct heat transfer fluid of the thermal energy distribution grid from the hot conduit connection via the second heat exchanger to the cold conduit connection. This mode may be used for active outtake of heat from the thermal energy distribution grid.

Upon set in a third mode, the valve arrangement is configured to direct heat transfer fluid of the thermal energy distribution grid from the hot conduit connection via the first heat exchanger to the cold conduit connection. This mode may be used for passive outtake of heat from the thermal energy distribution grid.

Upon set in a fourth mode, the valve arrangement is configured to direct heat transfer fluid of the thermal energy distribution grid from the cold conduit connection via the second heat exchanger to the hot conduit connection. This mode may be used for passive outtake of cold from the thermal energy distribution grid.

Upon setting the thermal energy extraction assembly in the heating mode the control unit may further be configured to set the cooling circuit by-pass control valve to direct a by-pass feed of cooling circuit heat transfer fluid from the feed conduit of the cooling circuit to the return conduit of the cooling circuit thereby fully or partly by-passing the cooler. Fully by-passing the cooler may set the thermal energy extraction assembly in a dedicated active heating mode. Partly by-passing the cooler or not by-passing the cooler may set the thermal energy extraction assembly in a combined heating and cooling mode.

Upon setting the thermal energy extraction assembly in the cooling mode the control unit may further be configured to set the heating circuit by-pass control valve to direct a by-pass feed of heating circuit heat transfer fluid from the feed conduit of the heating circuit to the return conduit of the heating circuit thereby fully or partly by-passing the heat emitter. Fully by-passing the heat emitter may set the thermal energy extraction assembly in a dedicated active cooling mode. Partly by-passing the heat emitter or not by-passing the heat emitter may set the thermal energy extraction assembly in a combined cooling and heating mode.

According to a second aspect a thermal energy distribution system is provided. The thermal energy distribution system comprising a thermal energy distribution grid and a plurality of thermal energy extraction assemblies according to the first aspect connected to the thermal energy distribution grid.

The above-mentioned features of the thermal energy extraction assembly according to the first aspect, when applicable, apply to this second aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

These and other aspects of the present invention will now be described in more detail, with reference to the appended drawings showing embodiments of the invention. The figures are provided to illustrate the general structures of embodiments of the present invention. Like reference numerals refer to like elements throughout.

DETAILED DESCRIPTION

Figure 1:
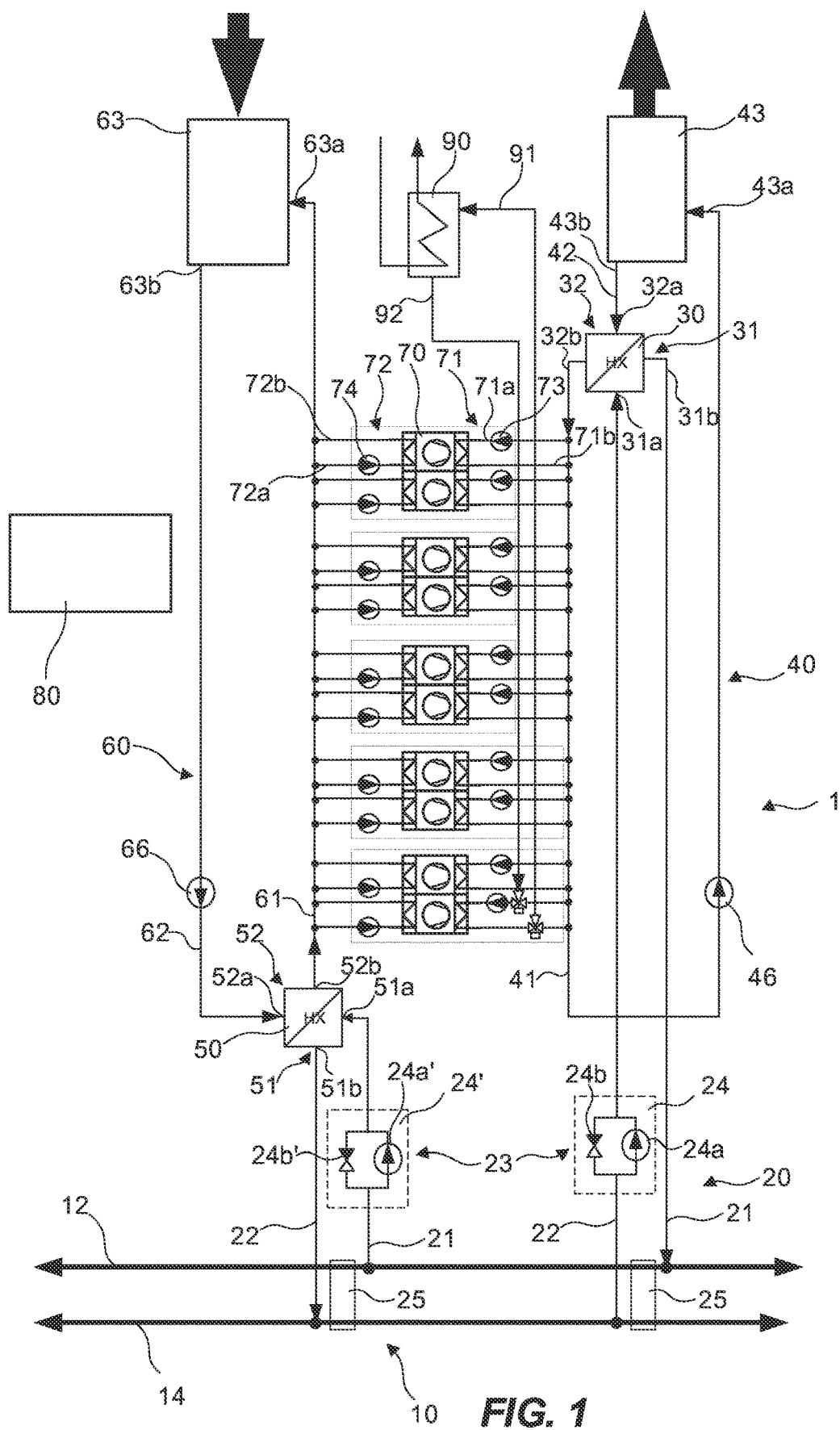
FIG. 1 is a schematic diagram of a thermal energy extraction assembly.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

In connection with FIG. 1 a thermal energy extraction assembly 1 will be discussed. The thermal energy extraction assembly 1 is configured to extract heat and/or cold from a thermal energy distribution grid 10. The thermal energy extraction assembly 1 is further configured to deliver the extracted heat and/or cold for heating and/or cooling a building or a part of a building, e.g. a portion of a multistore building. The portion of the building may be an apartment, an office space, a hotel room, etc. The heat may e.g. be delivered for comfort heating or tap hot water heating. The cold may e.g. be delivered for comfort cooling and/or tap cold water cooling. The thermal energy extraction assembly 1 is further configured to produce tap hot water.

The thermal energy distribution grid 10 is configured to distribute thermal energy using heat transfer fluid conducted in the thermal energy distribution grid 10. The heat transfer fluid may comprise water. However, other heat transfer fluids may be used. Some non-limiting examples are ammonia, oils, alcohols and anti-freezing liquids such as glycol. The heat transfer fluid may also comprise a mixture of two or more of the heat transfer fluids mentioned above. The thermal energy distribution grid 10 comprises two conduits, a hot conduit 12 and a cold conduit 14. The hot conduit 12 is configured to conduct heat transfer fluid of a first temperature. The cold conduit 14 is configured to conduct heat transfer fluid of a second temperature. The second temperature is lower than the first temperature. Hence, the temperature of the heat transfer fluid of the two conduits 12, 14 is set to be different. In case heat transfer fluid is water, a suitable temperature range for the hot heat transfer fluid is between 5 and 45° C. and a suitable temperature range for the cold heat transfer fluid is between 0 and 40° C. A suitable temperature difference between the first and second temperatures is in the range of 5–16° C., preferably in the range of 7–12° C., more preferably 8-10° C. Preferably, the thermal energy distribution grid 10 is set to operate with a sliding temperature difference which varies depending on e.g. the climate and/or demand for extraction of heat and/or cold from the thermal energy distribution grid 10 by thermal energy extraction assemblies 1 connected thereto. The person skilled in the art realizes that in case the heat transfer fluid is another medium than water other temperature ranges for the hot heat transfer fluid and the cold heat transfer fluid than the ones mentioned above may be used. For example, the medium of the heat transfer fluid may be chosen such that temperatures below 0° C. may be used. This may be realized by using water with added anti-freezing liquids, ammonia or oils.

The hot conduit 12 and the cool conduit 14 are separate. The hot conduit 12 and the cool conduit 14 may be parallelly arranged. The hot conduit 12 and/or the cool conduit 14 may be arranged as a closed loop of piping. Alternatively, the hot conduit 12 and/or the cool conduit 14 may be arranged as an open loop of piping. The two conduits 12, 14 of the thermal energy circuit 10 may be formed by plastic, composite, concrete, or metal pipes. According to one example High Density Polyethylene (HDPE) pipes may be used. The pipes may be single wall pipes. The pipes may be un-insulated. The two conduits 12, 14 of the thermal energy circuit 10 may be dimensioned for pressures up to 2.5 MPa (25 bar). According to other embodiments the two conduits 12, 14 of the thermal energy circuit 10 may be dimensioned for pressures up to 1 MPa (10 bar). According to other embodiments the two conduits 12, 14 of the thermal energy circuit 10 may be dimensioned for pressures up to 1.6 MPa (16 bar), pressures up to 1.0 MPa (10 bar) or for pressures up to 0.6 MPa (6 bar).

The thermal energy distribution grid 10 may be a district thermal energy distribution grid configured to distribute thermal energy to a plurality of buildings. An example of such a district thermal energy distribution grid is disclosed in WO 2017/076868 by the Applicant E.ON Sverige AB. The thermal energy distribution grid 10 may be a local thermal energy distribution grid arranged in a building, such as a multistore building. Particularly, the thermal energy distribution grid 10 may be vertically arranged in the building. The thermal energy distribution grid 10 may be arranged in a stairwell, a hoist way or any other suitable vertical structure of the building. The thermal energy distribution grid 10 may be configured to distribute thermal energy to different portions of the building.

The thermal energy distribution grid 10 is typically a bi-directional grid. Hence, heat transfer fluid may be conducted in any direction in the hot and cold conduits 12, 14 of the thermal energy distribution grid 10.

The thermal energy extraction assembly 1 comprises a first heat exchanger 30, a heating circuit 40, a second heat exchanger 50, a cooling circuit 60, and a plurality of heat pumps 70. The first and second heat exchangers 30, 50 are different heat exchangers. The thermal energy extraction assembly 1 comprises further comprises a connection circuit 20 connecting the assembly 1 to the thermal energy distribution grid 10.

Each heat pump 70 having a condenser side 71 connected to the heating circuit 40 and an evaporator side 72 connected to the cooling circuit 60. Each heat pump 70 being configured to pump heat from the cooling circuit 60 to the heating circuit 40.

The connection circuit 20 is forming a connection interface for connecting the thermal energy extraction assembly 1 to the thermal energy distribution grid 10. The connection circuit 20 comprises a hot conduit connection 21 connectable to the hot conduit 12 of the thermal energy distribution grid 10. The connection circuit 20 comprises a cold conduit connection 22 connectable to the cold conduit 14 of the thermal energy distribution grid 10. The connection circuit 20 is configured to fluidly interconnect the hot conduit 12 and the cold conduit 14. This in order to allow a flow of heat transfer fluid of the thermal energy distribution grid 10 grid from the hot conduit 12 via the first heat exchanger 30 and/or the second heat exchanger 50 to the cool conduit 14 or to allow a flow of heat transfer fluid of the thermal energy distribution grid 10 grid from the cold conduit 14 via the first heat exchanger 30 and/or the second heat exchanger 50 to the hot conduit 12. Hence, the connection circuit 20 may be bi-directional, it may conduct heat transfer fluid either from hot conduit 12 to the cold conduit 14 or from the cold conduit 14 to the hot conduit 12.

The connection circuit 20 may be designed in many different ways. In connection with FIG. 1 a design wherein the connection circuit 20 is divided into two separate circuits is illustrated. However, the connection circuit 20 may as well be designed as one single circuit. Two alternative one single circuit designs for the connection circuit 20 are illustrated in connection with FIGS. 2 and 3. Hence, in FIGS. 1-3 different example designs of the connection circuit 20 are illustrated. Common for all designs of the connection circuit 20 is that the connection circuit 20 is configured to direct a flow of heat transfer fluid from the hot conduit 12 via the second heat exchanger 50 to the cold conduit 14 and to direct a flow of heat transfer fluid from the cold conduit 14 via the first heat exchanger 30 to the hot conduit 12. The direction of flow for the flow heat transfer fluid in the connection circuit 20 is depending on if heat or cold is to be extracted by the thermal energy extraction assembly 1 from the thermal energy distribution grid 10.

In order to direct the flow of heat transfer fluid in the connection circuit 20, the connection circuit 20 comprises a valve arrangement 23. The valve arrangement 23 comprises one or more valves and/or one or more flow controllers 24, 24'. The one or more valves may comprise two-way valves, three-way vales or even four-way valves. The flow controller 24, 24' is configured to either pump or let flow heat transfer fluid therethrough. If the flow controller 24, 24' is set to either pump or let flow heat transfer fluid therethrough depend on desired flow direction therethrough and on a local differential pressure, $\Delta p$, between the hot conduit 12 and the cold conduit 14.

Embodiments of a flow controller may e.g. be found in PCT/EP2017/083077 by the applicant E.ON Sverige AB. The flow controller 24, 24' is configured to control the flow direction (from the hot conduit connection 21 to the cold conduit connection 22 or vice versa) of heat transfer fluid in the connection circuit 20 based on a desired flow direction and a local differential pressure, $\Delta p$, between the hot conduit 12 and the cold conduit 14. The local differential pressure, $\Delta p$, between the hot conduit 12 and the cold conduit 14 may be measured using a differential pressure measuring device 25. The flow controller 24, 24' is configured to be selectively set in a pumping mode or in a flowing mode. The setting of the flow controller 24, 24' in the pumping mode or in a flowing mode is based on the local differential pressure, $\Delta p$, between the hot conduit 12 and the cold conduit 14 and on the desired flow direction of heat transfer fluid in the connection circuit 20. Upon set in the pumping mode the flow controller 24, 24' is configured to act as a pump 24a, 24a' for pumping heat transfer fluid from the thermal energy distribution grid 10 into the first and/or second heat exchanger 30, 50. Hence, upon the flow controller 24, 24' being set in the pumping mode, heat transfer fluid from the thermal energy distribution grid 10 is pumped into the first and/or second heat exchanger 30, 50. Upon set in flowing mode the flow controller 24, 24' is configured to act as a flow regulator for allowing heat transfer fluid from the thermal energy distribution grid 10 to flow into the first and/or second heat exchanger 30, 50. The flow regulator may be seen as a valve 24b, 24b'. Hence, upon the flow controller 24, 24' being set in the flowing mode, heat transfer fluid from the thermal energy distribution grid 10 is allowed to flow into the first and/or second heat exchanger 30, 50. The choice of allowing heat transfer fluid from the thermal energy distribution grid 10 to flow into the first and/or second heat exchanger 30, 50 or pumping heat transfer fluid from the thermal energy distribution grid 10 into the first and/or second heat exchanger 30, 50, is made based on the local differential pressure, $\Delta p$, between the hot conduit 12 and the cold conduit 14 and on the desired flow direction of heat transfer fluid in the connection circuit 20 (either from the hot conduit connection 21 to the cold conduit connection 22 or from the cold conduit connection 22 to the hot conduit connection 21).

In the thermal energy distribution grid 10 a differential pressure between heat transfer fluid in the hot and cold conduits 12, 14 may change over time. More precisely, the differential pressure between heat transfer fluid of the hot and cold conduits 12, 14 may change such that the differential pressure changes from positive to negative or vice versa. Depending on the variating differential pressure between the hot and cold conduits 12, 14 and depending on the desired flow direction of heat transfer fluid in the connection circuit 20, sometimes heat transfer fluid need to be pumped through the connection circuit 20 and sometimes heat transfer fluid need to be allowed to flow through the connection circuit 20. Some examples are given directly below.

Assume that the valve arrangement 23 of the connection circuit 20 is set to direct heat transfer fluid from the hot conduit connection 21 to the cold conduit connection 22. Hence, heat transfer fluid of the thermal energy distribution grid 10 is set to be transferred from the hot conduit 12 via the first and/or the second heat exchanger 30, 50 to the cold conduit 14. In case the local differential pressure, $\Delta p$, between the hot conduit 12 and the cold conduit 14 is indicative of that there is a higher local pressure in the hot conduit 12 than in the cold conduit 14 the flow controller 24, 24' shall be set to allow a flow of heat transfer fluid to flow through the flow controller 24, 24'. Hence, the flow controller 24, 24' is set in the flowing mode. In case the local differential pressure, $\Delta p$, between the hot conduit 12 and the cold conduit 14 is indicative of that there is a lower local pressure in the hot conduit 12 than in the cold conduit 14 the flow controller 24, 24' shall be set to pump a flow of heat transfer fluid from the hot conduit 12 to the cold conduit 14. Hence, the flow controller 24, 24' is set in the pumping mode.

Assume that the connection circuit 20 is set to direct heat transfer fluid from the cold conduit connection 22 to the hot conduit connection 21. Hence, heat transfer fluid of the thermal energy distribution grid 10 is set to be transferred from the cold conduit 14 via the first and/or the second heat exchanger 30, 50 to the hot conduit 12. In case the local differential pressure, $\Delta p$, between the hot conduit 12 and the cold conduit 14 is indicative of that there is a higher local pressure in the cold conduit 14 than in the hot conduit 12 the flow controller 24, 24' shall be configured to allow a flow of heat transfer fluid to flow through the flow controller 24, 24'. Hence, the flow controller 24, 24' is set in the flowing mode. In case the local differential pressure, $\Delta p$, between the hot conduit 12 and the cold conduit 14 is indicative of that there is a lower local pressure in the cold conduit 14 than in the hot conduit 12 the flow controller 24, 24' shall be configured to pump a flow of heat transfer fluid from the cold conduit 14 to the hot conduit 12. Hence, the flow controller 24, 24' is set in the pumping mode.

A skilled person realizes that the specific design of the valve arrangement 23 may vary as long as the valve arrangement 23 may be set to direct the heat transfer of the thermal energy distribution grid 10 from the hot conduit connection 21 to the cold conduit connection 22 or vice versa and to supply the first and/or the second heat exchanger 30, 50 with the heat transfer fluid.

Figure 2:
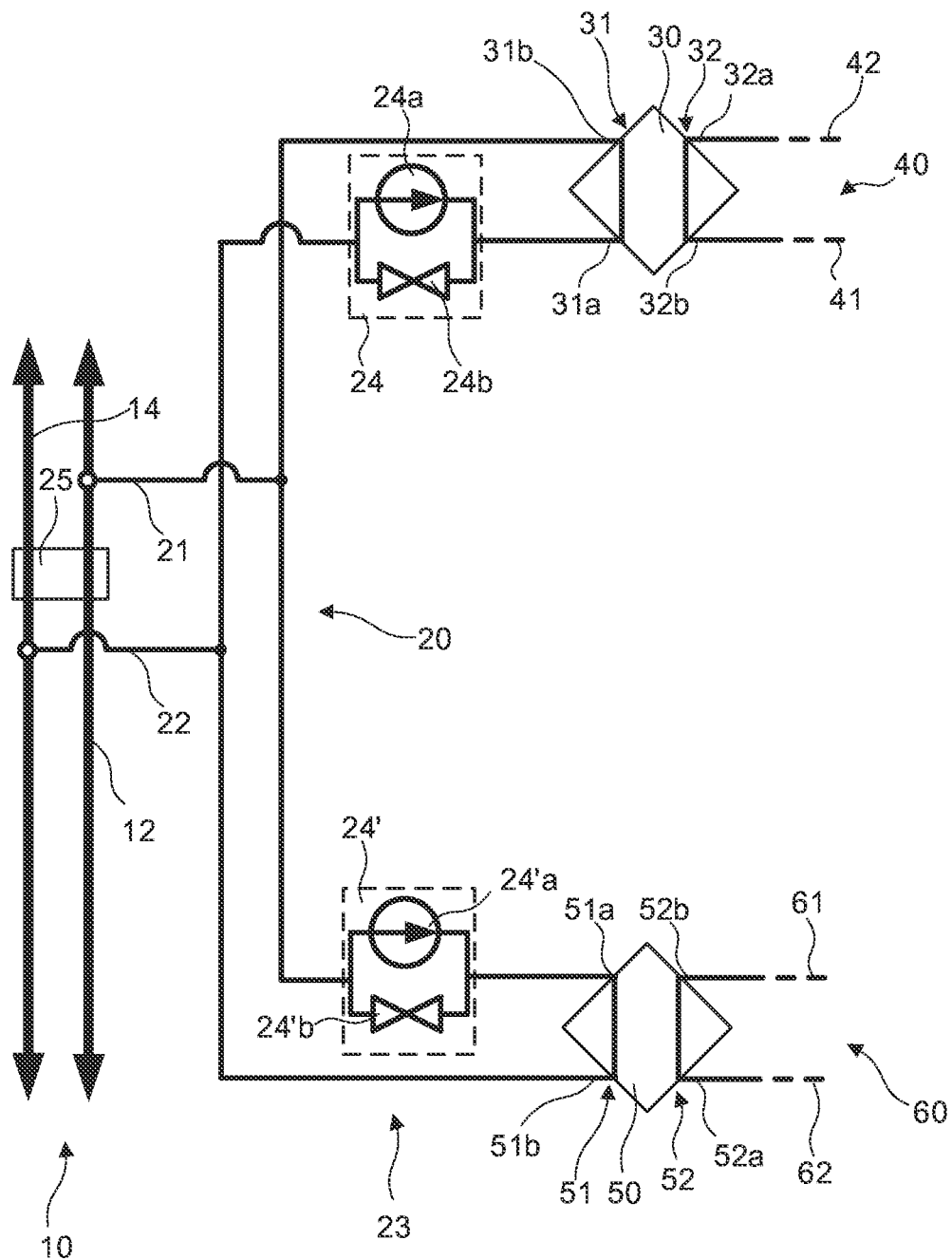
FIG. 2 is a schematic diagram of an alternative design for a connection circuit connecting a thermal energy extraction assembly to a thermal energy distribution grid.

In the FIGS. 1 and 2 examples, the valve arrangement 23 comprises two flow controllers 24, 24'. Upon activating the first flow controller 24, the first heat exchanger 30 will be supplied with heat transfer fluid from the cold conduit 14. After being supplied to the first heat exchanger 30 the heat transfer fluid is returned to the hot conduit 12. Upon activating the second flow controller 24', the second heat exchanger 50 will be supplied with heat transfer fluid from the hot conduit 12. After being supplied to the second heat exchanger 50 the heat transfer fluid is returned to the cold conduit 14. The first and second flow controllers 24, 24' are typically not activated at the same time. Accordingly, the valve arrangement 23 illustrated in FIG. 1 may be configured to direct the flow of heat transfer fluid in the connection circuit 20 to selectively supply either the first heat exchanger 30 or the second heat exchanger 50 with a supply of heat transfer fluid of the thermal energy distribution grid 10. Thus, the valve arrangement 23 may be configured to be set in different modes. In a first mode, the valve arrangement 23 is configured to direct heat transfer fluid from the cold conduit connection 22 via the first heat exchanger 30 to the hot conduit connection 21. In a second mode, the valve arrangement 23 is configured to direct heat transfer fluid from the hot conduit connection 21 via the second heat exchanger 50 to the cold conduit connection 22.

Figure 3:
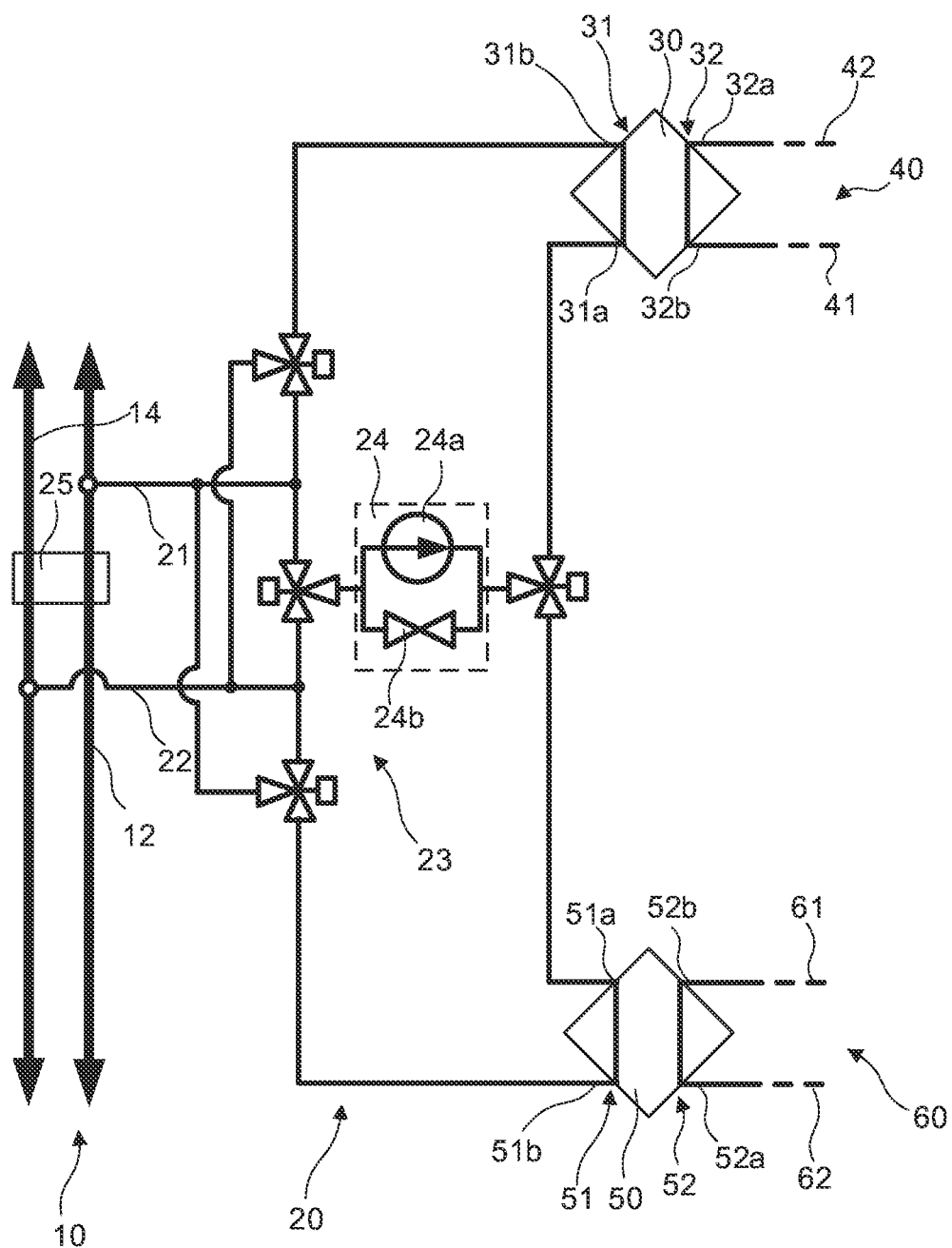
FIG. 3 is a schematic diagram of yet an alternative design for a connection circuit connecting a thermal energy extraction assembly to a thermal energy distribution grid.

In the FIG. 3 example, the valve arrangement 23 comprises a plurality of valves (in this example a plurality of three-way vales) and a flow controller 24. According to this example, the valve arrangement 23 is configured to be set in different modes. In a first mode, the valve arrangement 23 is configured to direct heat transfer fluid from the cold conduit connection 22 via the first heat exchanger 30 to the hot conduit connection 21. In a second mode, the valve arrangement 23 is configured to direct heat transfer fluid from the hot conduit connection 21 via the second heat exchanger 50 to the cold conduit connection 22. In a third mode, the valve arrangement 23 is configured to direct heat transfer fluid from the hot conduit connection 21 via the first heat exchanger 30 to the cold conduit connection 22. In a fourth mode, the valve arrangement 23 is configured to direct heat transfer fluid from the cold conduit connection 22 via the second heat exchanger 50 to the hot conduit connection 21. The valve arrangement 23 may be configured to be selectively set in the different modes. Hence, the valve arrangement 23 may be configured to be set in one specific mode at a time. Accordingly, the valve arrangement 23 may be configured to direct the flow of heat transfer fluid in the connection circuit 20 to selectively supply either the first heat exchanger 30 or the second heat exchanger 50 with a supply of heat transfer fluid of the thermal energy distribution grid 10. Alternatively, the valve arrangement 23 may be set in two of the modes at the same time. For example, the first mode and the fourth mode may be simultaneously set, or the second mode and the third mode may be simultaneously set.

Next the first and second heat exchangers 30 50 will be discussed. The first heat exchanger 30 is configured to exchange heat from the heating circuit 40 to the thermal energy distribution grid 10. The second heat exchanger 50 is configured to exchange heat from the thermal energy distribution grid 10 to the cooling circuit 60. Heat exchangers as such are well known in the art and can basically be described as comprising an arrangement of a primary side comprising a first circuit circulating a first fluid having a first temperature, and a secondary side comprising a second circuit circulating a second fluid having a second temperature. The first and second circuits closely abutting each other along a respective extension thereof. By the two circuits along an extension closely abutting each other a heat transfer takes place between the first and second fluids. The two circuits of the respective heat exchanger are arranged such that the heat transfer fluid in the respective circuit is flowing in opposite directions. In order not to complicate the drawings of FIGS. 1-3 the opposite direction of the two circuit are not explicitly illustrated in the respective schematic drawing.

For the first heat exchanger 30, a primary side 31, comprising the first circuit, forms part of the connection circuit 20 and a secondary side 32 comprising the second circuit forms part of a heating circuit 40. For the second heat exchanger 50, a primary side 51, comprising the first circuit, forms part of the connection circuit 20 and a secondary side 52 comprising the second circuit forms part of a cooling circuit 60.

The heating circuit 40 and the connection circuit 20 are fluidly separated. The cooling circuit 60 and the connection circuit 20 are fluidly separated. The cooling circuit 60 and the heating circuit 40 are fluidly separated.

The primary side 31 of the first heat exchanger 30 and the primary side 51 of the secondary heat exchanger 50 each comprises a primary side inlet 31a, 51a and a primary side outlet 31b, 51b.

In the in FIGS. 1 and 2 illustrated examples of the connection circuit 20, the primary side inlet 31a of the first heat exchanger 30 is connected to the cold conduit connection 22 of the connection circuit 20 and the primary side outlet 31b of the first heat exchanger 30 is connected to the hot conduit connection 21 of the connection circuit 20. Further, in the in FIGS. 1 and 2 illustrated examples of the connection circuit 20, the primary side inlet 51a of the second heat exchanger 50 is connected to the hot conduit connection 21 of the connection circuit 20 and the primary side outlet 51b of the second heat exchanger 50 is connected to the cold conduit connection 22 of the connection circuit 20.

In the in FIG. 3 illustrated example of the connection circuit 20, the primary side inlet 31a of the first heat exchanger 30 is selectively, via the valve arrangement 23, connected to either the cold conduit connection 22 or the hot conduit connection 21 of the connection circuit 20. Further, the primary side outlet 31b of the first heat exchanger 30 is selectively, via the valve arrangement 23, connected to either the cold conduit connection 22 or the hot conduit connection 21 of the connection circuit 20. Upon the valve arrangement 23 is set to connect the primary side inlet 31a of the first heat exchanger 30 to the cold conduit connection 22, the valve arrangement 23 is at the same time set to connect the primary side outlet 31b of the first heat exchanger 30 to hot conduit connection 21. Further, upon the valve arrangement 23 is set to connect the primary side inlet 31a of the first heat exchanger 30 to the hot conduit connection 21, the valve arrangement 23 is at the same time set to connect the primary side outlet 31b of the first heat exchanger 30 to the cold conduit connection 22.

Moreover, in the in FIG. 3 illustrated example of the connection circuit 20, the primary side inlet 51a of the second heat exchanger 50 is selectively, via the valve arrangement 23, connected to either the cold conduit connection 22 or the hot conduit connection 21 of the connection circuit 20. Further, the primary side outlet 51b of the second heat exchanger 50 is selectively, via the valve arrangement 23, connected to either the cold conduit connection 22 or the hot conduit connection 21 of the connection circuit 20. Upon the valve arrangement 23 is set to connect the primary side inlet 51a of the second heat exchanger 50 to the cold conduit connection 22, the valve arrangement 23 is at the same time set to connect the primary side outlet 51b of the second heat exchanger 50 to hot conduit connection 21. Further, upon the valve arrangement 23 is set to connect the primary side inlet 51a of the second heat exchanger 50 to the hot conduit connection 21, the valve arrangement 23 is at the same time set to connect the primary side outlet 51b of the second heat exchanger 50 to the cold conduit connection 22.

The secondary side 32 of the first heat exchanger 30 comprises a secondary side inlet 32a and a secondary side outlet 32b. The secondary side inlet 32a is connected to a return conduit 42 of the heating circuit 40. The secondary side outlet 32b is connected to a feed conduit 41 of the heating circuit 40. The feed conduit 41 of the heating circuit 40 is configured to feed a heat emitter 43 with heating circuit heat transfer fluid conducted in the heating circuit 40. The heat emitter 43 comprises an inlet 43a connected to the feed conduit 41 of the heating circuit 40. The return conduit 42 of the heating circuit 40 is configured to return heating circuit heat transfer fluid from the heat emitter 43. The heat emitter 43 comprises an outlet 43b connected to the return conduit 42 of the heating circuit 40. The heat emitter 43 is configured to consume heat from incoming heating circuit heat transfer fluid for heating surroundings of the heat emitter 43. Hence, the heat emitter 43 is configured to deliver heating. The heating may e.g. be delivered as comfort heating or process heating. A plurality of heat emitter 43 may be connected to the heating circuit 40.

The heating circuit heat transfer fluid may comprise water. However, other heat transfer fluids may be used. Some non-limiting examples are ammonia, oils, alcohols and anti-freezing liquids such as glycol. The heating circuit heat transfer fluid may also comprise a mixture of two or more of the heat transfer fluids mentioned above.

The first heat exchanger 30 is configured to exchange thermal energy between heat transfer fluid conducted in the connection circuit 20 and heating circuit heat transfer fluid of the heating circuit 40. The first heat exchanger 30 may be configured to extract heat from heating circuit heat transfer fluid of the heating circuit 40 and deposit the extracted heat in heat transfer fluid of the connection circuit 20. Hence, the first heat exchanger 30 may be configured to cool the heating circuit heat transfer fluid of the heating circuit 40. The above may be made by setting the valve arrangement 23 of the connection circuit 20 to direct a flow of heat transfer fluid from the cold conduit connection 22 via the first heat exchanger 30 to the hot conduit connection 21.

In addition to be able to extract heat from the heating circuit heat transfer fluid of the heating circuit 40 and deposit the extracted heat in heat transfer fluid of the connection circuit 20 as discussed above, for the example illustrated in connection with FIG. 3, the first heat exchanger 30 may alternatively be configured to extract heat from heat transfer fluid of the connection circuit 20 and deposit the extracted heat in heating circuit heat transfer fluid of the heating circuit 40. Hence, the first heat exchanger 30 may be configured to heat the heating circuit heat transfer fluid of the heating circuit 40. This is made by setting the valve arrangement 23 of the connection circuit 20 to direct a flow of heat transfer fluid from the hot conduit connection 21 via the first heat exchanger 30 to the cold conduit connection 22.

The secondary side 52 of the second heat exchanger 50 comprises a secondary side inlet 52a and a secondary side outlet 52b. The secondary side inlet 52a is connected to a return conduit 62 of the cooling circuit 60. The secondary side outlet 52b is connected to a feed conduit 61 of the cooling circuit 40. The feed conduit 61 of the cooling circuit 60 is configured to feed a cooler 63 with cooling circuit heat transfer fluid conducted in the cooling circuit 60. The cooler 63 comprises an inlet 63a connected to the feed conduit 61 of the cooling circuit 60. The return conduit 62 of the cooling circuit 60 is configured to return cooling circuit heat transfer fluid from the cooler 63. The cooler 63 comprises an outlet 63b connected to the return conduit 62 of the cooling circuit 60. The cooler 63 is configured to absorb heat from its surroundings in order to cool the soundings of the cooler 63 by transferring absorbed heat to incoming cooling circuit heat transfer fluid in the cooling circuit 60. Hence, the cooler 63 is configured to deliver cooling. The cooling may e.g. be delivered as comfort cooling, process cooling, or tap water cooling. A plurality of coolers 63 may be connected to the cooling circuit 40.

The cooling circuit heat transfer fluid may comprise water. However, other heat transfer fluids may be used. Some non-limiting examples are ammonia, oils, alcohols and anti-freezing liquids such as glycol. The cooling circuit heat transfer fluid may also comprise a mixture of two or more of the heat transfer fluids mentioned above.

The second heat exchanger 50 is configured to exchange thermal energy between heat transfer fluid conducted in the connection circuit 20 and cooling circuit heat transfer fluid of the cooling circuit 60. The second heat exchanger 50 may be configured to extract heat from heat transfer fluid conducted in the connection circuit 20 and deposit the extracted heat in cooling circuit heat transfer fluid of the cooling circuit 60. Hence, the second heat exchanger 50 may be configured to heat the cooling circuit heat transfer fluid of the cooling circuit 40. The above may be made by setting the valve arrangement 23 of the connection circuit 20 to direct a flow of heat transfer fluid from the hot conduit connection 21 via the second heat exchanger 50 to the cold conduit connection 22.

In addition to be able to extract heat from heat transfer fluid of the connection circuit 20 and deposit the extracted heat in the cooling circuit heat transfer fluid of the cooling circuit 60 as discussed above, for the example illustrated in connection with FIG. 3, the second heat exchanger 50 may be configured to extract heat from cooling circuit heat transfer fluid of the cooling circuit 60 and deposit the extracted heat in heat transfer fluid of the connection circuit 20. Hence, the second heat exchanger 50 may be configured to cool the cooling circuit heat transfer fluid of the cooling circuit 60. This is made by setting the valve arrangement 23 of the connection circuit 20 to direct a flow of heat transfer fluid from the cold conduit connection 22 via the second heat exchanger 50 to the hot conduit connection 21.

As mentioned above the thermal energy extraction assembly 1 comprises a plurality of heat pumps 70. In the in FIG. 1 illustrated example ten heat pumps 70 are illustrated. In the in FIG. 1 illustrated example the heat pumps 70 are bundled in pairs. However, this is not necessary. Further, it is understood that the thermal energy extraction assembly 1 may comprise less than or more than ten heat pumps 70. Accordingly, the thermal energy extraction assembly 1 comprises two or more heat pumps 70. The number of heat pumps 70 of the thermal energy extraction assembly 1 may be selected based on a heat pump capacity needed for providing a maximum desired heating and/or cooling demands. In case the heating demand is higher than the cooling demand this will be the dimensioning demand. In case the cooling demand is higher than the heating demand this will be the dimensioning demand. It is further understood that heat pumps 70 may be added to the thermal energy extraction assembly 1 in the future upon the demand for heating and/or cooling increases. For simplicity of the drawing only one of the heat pumps and the features thereof are indicated with reference numerals. Heat pumps as such, are well known in the art and basically comprises a closed circuit in which brine is circulated between a first heat exchanger at a condenser side 71 of the heat pump 70 and a second heat exchanger at an evaporator side 72 of the heat pump 70. The condenser side 71 of the heat pump 70 has an inlet 71a and an outlet 71b via which the heat pump 70 is connected to the heating circuit 40. The inlet 71a and the outlet 71b of the condenser side 71 of the heat pump 70 may be connected to the heating circuit 40 at the feed conduit 41 of the heating circuit 40. Preferably, the inlet 71a of the condenser side 71 of the heat pump 70 is connected to the feed conduit 41 of the heating circuit 40 closer to the outlet 32b of the secondary side 32 of the first heat exchanger 30 than the outlet 71b of the condenser side 71 of the heat pump 70. Hence, the inlet 71a of the condenser side 71 of the heat pump 70 is connected upstream the outlet 71b of the condenser side 71 of the heat pump 70 as seen in the flow direction of heating circuit heat transfer fluid in the feed conduit 41 of the heating circuit 40.

Likewise, the evaporator side 72 of the heat pump 70 has an inlet 72a and an outlet 72b via which the heat pump 70 is connected to the cooling circuit 60. The inlet 72a and the outlet 72b of the evaporator side 72 of the heat pump 70 may be connected to the cooling circuit 60 at the feed conduit 61 of the heating circuit 60. Preferably, the inlet 72a of the evaporator side 72 of the heat pump 70 is connected to the feed conduit 61 of the cooling circuit 60 closer to the outlet 52b of the secondary side 52 of the second heat exchanger 50 than the outlet 72b of the evaporator side 72 of the heat pump 70. Hence, the inlet 72a of the evaporator side 72 of the heat pump 70 is connected upstream the outlet 72b of the evaporator side 72 of the heat pump 70 as seen in the flow direction of cooling circuit heat transfer fluid in the feed conduit 61 of the cooling circuit 60.

The plurality of heat pumps 70 is preferably connected between the heating circuit 40 and the cooling circuit 60 in parallel. The plurality of heat pumps 70 may be individually controllable. Hence, each of the plurality of heat pumps 70 may be controlled independently of the other heat pumps 70. One or more of the heat pumps 70 may be variably controllable. Hence, one or more of the heat pumps 70 may be controlled such that a variable degree of heat is pumped by the respective heat pump 70. One or more of the heat pumps 70 may be binary controllable. Hence, one or more of the heat pumps 70 may be controlled such that the respective heat pump 70 is set in either an on mode or in an off mode. All, or a majority, of the heat pumps 70 may be of a same specification of heat pump 70. Hence, all, or a majority, of the heat pumps 70 may be operated, serviced or repaired according to a common scheme. Accordingly, an operator or service technician only need to learn one type of heat pump 70.

Each heat pump 70 is configured to pump heat from the evaporator side 72 to the condenser side 71, thereof. Hence, the heat pump 70 is configured to pump heat from cooling circuit heat transfer fluid of the cooling circuit 60 to heating circuit heat transfer fluid of the heating circuit 40. Differently phased, the heat pump 70 is configured to pump cold from heating circuit heat transfer fluid of the heating circuit 40 to cooling circuit heat transfer fluid of the cooling circuit 60.

Each heat pump 70 may comprise a condenser side pump 73. The condenser side pump 73 is configured to pump heating circuit heat transfer fluid through the condenser side 71 of the heat pump 70. Each heat pump 70 may comprise an evaporator side pump 74. The evaporator side pump 74 is configured to pump cooling circuit heat transfer fluid through the evaporator side 72 of the heat pump 70.

The heating circuit 40 may further comprise a heating circuit circulation pump 46. The heating circuit circulation pump 46 is configured to circulate heating circuit heat transfer fluid in the heating circuit 40. The heating circuit circulation pump 46 may be arranged in the feed conduit 41 of the heating circuit 40. Alternatively, the heating circuit circulation pump 46 may be arranged in the return conduit 42 of the heating circuit 40.

The cooling circuit 60 may further comprise a cooling circuit circulation pump 66. The cooling circuit circulation pump 66 is configured to circulate cooling circuit heat transfer fluid in the cooling circuit 60. The cooling circuit circulation pump 66 may be arranged in the return conduit 62 of the cooling circuit 60. Alternatively, the cooling circuit circulation pump 66 may be arranged in the feed conduit 61 of the cooling circuit 60.

The thermal energy extraction assembly 1 may further comprise a control unit 80. Functions and operations of the control unit 80 may be embodied in the form of executable logic routines (e.g., lines of code, software programs, etc.) that are stored on a non-transitory computer readable medium of the control unit 80 and are executed by a control circuit of the control unit 80. The control circuit may e.g. comprise a processor. Furthermore, the functions and operations of the control unit 80 may be a stand-alone software application or form a part of a software application that carries out additional tasks related to the control unit 80. The described functions and operations may be considering a method that the corresponding device is configured to carry out. Also, while the described functions and operations may be implemented in software, such functionality may as well be carried out via dedicated hardware or firmware, or some combination of hardware, firmware and/or software. Hence, the control unit 80 may be implemented as a hardware implemented control unit 80, a software implemented control unit 80, or as a combination thereof.

The control unit 80 is configured to individually control each of the plurality of heat pumps 70. The control unit 80 may individually set each of the plurality of heat pumps 70 in an on mode or in an off mode. Hence, the control unit 80 may control each of the plurality of heat pumps 70 in a binary manner setting each of the plurality of heat pumps 70 in either the on mode or in the off mode. Alternatively, the control unit 80 may be configured to individually adjust the heat pumping capacity of each of the plurality of heat pumps 70.

The control unit 80 may further be configured to set the thermal energy extraction assembly 1 in a heating mode or in a cooling mode. The control unit 80 may be configured to set the thermal energy extraction assembly 1 in either the heating mode or in the cooling mode at a specific point in time. The control unit 80 may be configured to set the thermal energy extraction assembly 1 in both the heating mode and in the cooling mode at a specific point in time.

Upon setting the thermal energy extraction assembly 1 in the heating mode the control unit 80 is configured to set the valve arrangement 23 to direct a flow of heat transfer fluid in the connection circuit 20 from the hot conduit connection 21 via the second heat exchanger 50 to the cold conduit connection 22. Doing so, the second heat exchanger 50 may exchange heat from heat transfer fluid of the connection circuit 20 to cooling circuit heat transfer fluid of the cooling circuit 60. Further, upon setting the thermal energy extraction assembly 1 in the heating mode the control unit 80 is configured to activate one or more of the heat pumps 70 to pump heat from cooling circuit heat transfer fluid of the cooling circuit 60 to heating circuit heat transfer fluid of the heating circuit 40. The heat emitter 43 may thereafter consume heat from the heated heating circuit heat transfer fluid for heating surroundings of the heat emitter 43.

Upon setting the thermal energy extraction assembly 1 in the cooling mode the control unit 80 is configured to set the valve arrangement 23 to direct a flow of heat transfer fluid in the connection circuit 20 from the cold conduit connection 22 via the first heat exchanger 30 to the hot conduit connection 21. Doing so, the first heat exchanger 30 may exchange cold from heat transfer fluid of the connection circuit 20 to heating circuit heat transfer fluid of the heating circuit 40. It is understood that exchanging cold from heat transfer fluid of the connection circuit 20 to heating circuit heat transfer fluid of the heating circuit 40 is the same as exchanging heat from heating circuit heat transfer fluid of the heating circuit 40 to heat transfer fluid of the connection circuit 20. Further, upon setting the thermal energy extraction assembly 1 in the cooling mode the control unit 80 is configured to activate one or more of the heat pumps 70 to pump cold from heating circuit heat transfer fluid of the heating circuit 40 to cooling circuit heat transfer fluid of the cooling circuit 60. It is understood that pumping cold from heating circuit heat transfer fluid of the heating circuit 40 to cooling circuit heat transfer fluid of the cooling circuit 60 is the same as pumping heat from cooling circuit heat transfer fluid of the cooling circuit 60 to heating circuit heat transfer fluid of the heating circuit 40. The cooler 43 may thereafter consume cold from the cooled cooling circuit heat transfer fluid for cooling surroundings of the cooler 63. It is understood that consuming cold from the cooled cooling circuit heat transfer fluid for cooling surroundings of the cooler 63 is the same as absorbing heat from surroundings of the cooler 43 and depositing the absorbed heat in cooling heat transfer fluid of the cooling circuit 60.

The thermal energy extraction assembly 1 may further comprise a tap hot water heater 90. The tap hot water heater is configured to heat an incoming flow of tap water. Heat supplied to the incoming flow of tap water is extracted from an incoming flow of heating circuit heat transfer fluid of the heating circuit 40. The incoming flow of heating circuit heat transfer fluid to the tap hot water heater 90 is feed via a tap hot water feeding conduit 91. The tap hot water feeding conduit 91 is configured to conduct heating circuit heat transfer fluid from condenser side 71 outlets 71*b* of a subset of the heat pumps 70 to the tap hot water heater 90. An, from the tap hot water heater 90, outgoing flow of heating circuit heat transfer fluid is returned to the heating circuit 40 via a tap hot water feeding conduit 91. The tap hot water feeding conduit 91 is configured to conduct heating circuit heat transfer fluid from the tap hot water heater 90 to condenser side 71 inlets 71*a* of the subset of the heat pumps 70. In the illustrated example in FIG. 1 the subset of heat pumps comprises one heat pump 70. However, the subset of the heat pumps 70 may be two or more of the plurality of the heat pumps 70. By using two or more of the heat pumps 70 for tap hot water production will increase the redundancy of the assembly for tap hot water production. The heat pump(s) (70) being connected to the tap hot water heater 90 are selectively connected to the tap hot water heater 90 in order to be selectively used for tap hot water production. When not used for tap hot water production the heat pump(s) 70 may be used for transferring heat/cold between the heating and cooling circuits 40, 60. Preferably, the heat pump(s) 70 used for tap hot water production are the heat pump(s) 70 connected closest to the second heat exchanger 50.

The person skilled in the art realizes that the present invention by no means is limited to the preferred embodiments described above. On the contrary, many modifications and variations are possible within the scope of the appended claims.

For example, the thermal energy distribution grid 10 and a plurality of thermal energy extraction assemblies 1, as discussed above, connected thereto may constitute a thermal energy distribution system.

Moreover, the control unit 80 may be configured to control the condenser side pump 73 and/or the evaporator side pump 74. The control unit 80 may further be configured to control the heating circuit circulation pump 46 and/or the cooling circuit circulation pump 66.

Additionally, variations to the disclosed embodiments can be understood and effected by the skilled person in practicing the claimed invention, from a study of the drawings, the disclosure, and the appended claims.

The invention claimed is:

1. A thermal energy extraction assembly comprising:
a first heat exchanger comprising a primary side and a secondary side, the primary side being connectable to a thermal energy distribution grid, the secondary side being connected to a heating circuit, the heating circuit comprising a feed conduit configured to conduct heating circuit heat transfer fluid from an outlet of the secondary side of the first heat exchanger to a heat emitter and a return conduit configured to conduct heating circuit heat transfer fluid from the heat emitter to an inlet of the secondary side of the first heat exchanger, the first heat exchanger being configured to exchange heat from the secondary side to the primary side;
a second heat exchanger comprising a primary side and a secondary side, the primary side being connectable to the thermal energy distribution grid, the secondary side being connected to a cooling circuit, the cooling circuit comprising a feed conduit configured to conduct cooling circuit heat transfer fluid from an outlet of the secondary side of the second heat exchanger to a cooler and a return conduit configured to conduct cooling circuit heat transfer fluid from the cooler to an inlet of the secondary side of the second heat exchanger, the second heat exchanger being configured to exchange heat from the primary side to the secondary side;
a plurality of heat pumps each having a condenser side comprising an inlet and an outlet, both the inlet and the outlet of the condenser side being directly connected to the feed conduit of the heating circuit, and an evaporator side comprising an inlet and an outlet, both the inlet and the outlet of the evaporator side being directly connected to the feed conduit of the cooling circuit, wherein each heat pump being configured to pump heat from cooling circuit heat transfer fluid of the cooling circuit to heating circuit heat transfer fluid of the heating circuits;
a connection circuit comprising a heating circuit by-pass conduit configured to selectively direct a by-pass feed of the heating circuit heat transfer fluid from the feed conduit of the heating circuit to the return conduit of the heating circuit and a cooling circuit by-pass conduit configured to selectively direct a by-pass feed of the cooling circuit heat transfer fluid from the feed conduit of the cooling circuit to the return conduit of the cooling circuit; and a valve assembly comprising a heating circuit by-pass control valve configured to partly or fully by-pass the heat emitter and a cooling circuit by-pass control valve configured to partly or fully by-pass the cooler, wherein at least the operation of the heating circuit by-pass control valve and the cooling circuit by-pass control valve enable operation of the thermal energy extraction assembly in a dual mode wherein both the heat emitter and the cooler operate simultaneously.

2. The thermal energy extraction assembly according to claim 1, wherein the primary side of the first heat exchanger comprises a primary side inlet connectable to a cold conduit of the thermal energy distribution grid and a primary side outlet connectable to a hot conduit of the thermal energy distribution grid, and wherein the primary side of the second heat exchanger comprising a primary side inlet connectable to the hot conduit of the thermal energy distribution grid and a primary side outlet connectable to the cold conduit of the thermal energy distribution grid.

3. The thermal energy extraction assembly according to claim 1, wherein the plurality of heat pumps are connected between the heating circuit and the cooling circuit in parallel.

4. The thermal energy extraction assembly according to claim 1, wherein each of the plurality of heat pumps is binary controllable to be either in an on mode or in an off mode.

5. The thermal energy extraction assembly according to claim 1, further comprising a heat pump controller configured to individually control each of the plurality of heat pumps.

6. The thermal energy extraction assembly according to claim 2, wherein the connection circuit further comprises a hot conduit connection connectable to the hot conduit of the thermal energy distribution grid and a cold conduit connection connectable to the cold conduit of the thermal energy distribution grid, the connection circuit being configured to conduct heat transfer fluid of the thermal energy distribution grid from the hot conduit connection to the cold conduit connection or vice versa; and wherein the connection circuit further comprises a valve arrangement configured to selectively direct a flow of heat transfer fluid in the connection circuit from the cold conduit connection via the primary side of the first heat exchanger to the hot conduit connection or from the hot conduit connection via the primary side of the second heat exchanger to the cold conduit connection.

7. The thermal energy extraction assembly according to claim 6, further comprising a heat pump controller configured to individually control each of the plurality of heat pumps, wherein the heat pump controller is configured to set the thermal energy extraction assembly in a heating mode or in a cooling mode, wherein:

upon setting the thermal energy extraction assembly in the heating mode the heat pump controller is configured to:

set the valve arrangement to direct a flow of heat transfer fluid in the connection circuit from the hot conduit connection via the primary side of the second heat exchanger to the cold conduit connection, and activate one or more of the plurality of heat pumps to pump heat from cooling circuit heat transfer fluid of the cooling circuit to heating circuit heat transfer fluid of the heating circuit; and upon setting the thermal energy extraction assembly in the cooling mode the heat pump controller is configured to:

set the valve arrangement to direct a flow of heat transfer fluid in the connection circuit from the cold conduit connection via the primary side of the first heat exchanger to the hot conduit connection, and activate one or more of the plurality of heat pumps to pump cold from heating circuit heat transfer fluid of the heating circuit to cooling circuit heat transfer fluid of the cooling circuit.

8. The thermal energy extraction assembly according to claim 6, wherein the valve arrangement comprises a flow controller configured to control the flow of heat transfer fluid in the connection circuit from the hot conduit connection to the cold conduit connection or vice versa, wherein the flow controller is configured to be selectively set in a pumping mode or in a flowing mode based on a local differential pressure between the hot conduit and the cold conduit and on a desired flow direction of heat transfer fluid in the connection circuit.

9. The thermal energy extraction assembly according to claim 1, wherein the feed conduit of the heating circuit is configured to feed a comfort heating heat emitter with heating circuit heat transfer fluid, wherein the return conduit of the heating circuit is configured to return heating circuit heat transfer fluid from the comfort heating heat emitter to the first heat exchanger, wherein the feed conduit of the cooling circuit is configured to feed a comfort cooling cooler with cooling circuit heat transfer fluid, and wherein the return conduit of the cooling circuit is configured to return cooling circuit heat transfer fluid from the comfort cooling cooler to the second heat exchanger.

10. The thermal energy extraction assembly according to claim 1, further comprising a tap hot water heater, a tap hot water feeding conduit configured to conduct heating circuit heat transfer fluid from condenser side outlets of a subset of the heat pumps to the tap hot water heater, and a tap hot water return conduit configured to conduct heating circuit heat transfer fluid from the tap hot water heater to condenser side inlets of the subset of the heat pumps.

11. The thermal energy extraction assembly according to claim 10, wherein the subset of the heat pumps is less than 50% of the heat pumps.

12. A thermal energy distribution system comprising a thermal energy distribution grid and a plurality of thermal energy extraction assemblies according to claim 1 connected to the thermal energy distribution grid.

\* \* \* \* \*